United States Patent [19]
Elliott

[11] Patent Number: 5,562,251
[45] Date of Patent: Oct. 8, 1996

[54] GAS NOZZLE FOR BAG HOUSE CLEANING SYSTEMS

[75] Inventor: Jeff Elliott, Milperra, Australia

[73] Assignee: Goyen Controls & Co. Pty. Limited, Milperra, Australia

[21] Appl. No.: 297,024

[22] Filed: Aug. 29, 1994

[30] Foreign Application Priority Data

Sep. 3, 1993 [AU] Australia .................... PM1028

[51] Int. Cl.$^6$ .................. B05B 1/00; B01D 46/04
[52] U.S. Cl. .................. 239/396; 239/429; 239/433; 239/590
[58] Field of Search .............. 239/419.3, 419.5, 239/428, 428.5, 429–431, 434, 589, 590, 600, 433, 396; 55/302

[56] References Cited

U.S. PATENT DOCUMENTS

| | | | |
|---|---|---|---|
| 3,002,553 | 10/1961 | Reed | 239/419.5 |
| 3,063,494 | 11/1962 | Meyer | 239/431 |
| 3,073,097 | 1/1963 | Hallett et al. . | |
| 3,129,892 | 4/1964 | Tillman | 239/431 |
| 3,647,142 | 3/1972 | Drude et al. | 239/419.5 |
| 3,724,762 | 4/1973 | Freshour et al. | 239/419.5 |
| 3,777,458 | 12/1973 | Dence . | |
| 3,926,595 | 12/1975 | Bockman . | |
| 3,983,036 | 9/1976 | Lauzeral et al. . | |
| 4,131,440 | 12/1978 | Aurell . | |
| 4,247,310 | 1/1981 | Borst . | |
| 4,247,313 | 1/1981 | Perry, Jr. et al. . | |
| 4,289,511 | 9/1981 | Johnson, Jr. . | |
| 4,298,360 | 11/1981 | Poll . | |
| 4,306,888 | 12/1981 | Cheng . | |
| 4,356,010 | 10/1982 | Meyer zu Riemsloh . | |
| 4,573,639 | 3/1986 | Logue | 239/428.5 |
| 4,655,603 | 4/1987 | Palm . | |
| 5,054,688 | 10/1991 | Grindley | 239/428.5 |
| 5,085,371 | 2/1992 | Paige | 239/428.5 |

FOREIGN PATENT DOCUMENTS

| | | |
|---|---|---|
| 46175/72 | 3/1974 | Australia . |
| 42527/78 | 6/1980 | Australia . |
| 62488/80 | 4/1981 | Australia . |
| 89725/82 | 4/1983 | Australia . |
| 55623/80 | 5/1983 | Australia . |
| 81360/82 | 4/1985 | Australia . |
| 36777/89 | 2/1990 | Australia . |
| 13091/92 | 10/1992 | Australia . |
| 2015303 | 10/1970 | Germany . |
| 2031011 | 12/1970 | Germany . |
| 2053692 | 5/1972 | Germany . |
| 2007798 | 11/1992 | Germany . |
| 1345977 | 2/1974 | United Kingdom . |
| 92/00134 | 1/1992 | WIPO . |

*Primary Examiner*—Karen Merritt
*Attorney, Agent, or Firm*—Learman & McCulloch

[57] ABSTRACT

A reverse pulse cleaning system for use in a bag house filter including a blow tube (2) having outlet holes (3) to direct high velocity air pulses into filter bags to be cleaned. The systems includes a nozzle (1) having a control formation between the inlet and outlet ends of the nozzle. The control formation determines air flow characteristics such as velocity and direction of flow emerging from the outlet holes (3) and can improve uniformity and effectiveness of filter bag cleaning. A clampable and releasable fixing of the nozzle (1) to the blow tube allows replacement of the control formation with one of different characteristics during manufacturing or insitu fine tuning. The fixing allows the precise alignment of nozzles (1) on assembly which reduces the need for costly precision in forming the blow tube outlet holes (3). The system may include a tube (9) forming part of the nozzle with adjustable radial holes (13) to induce secondary air into the cleaning flow and may include a venturi (10) to induce tertiary air.

22 Claims, 14 Drawing Sheets

GAS NOZZLE FOR BAG HOUSE CLEANING SYSTEMS

FIELD OF THE INVENTION

The present invention relates to cleaning arrangements for bag house filtering systems.

BACKGROUND ART

Bag House filtering systems commonly comprise a particle collection chamber into which air containing particles is directed in order to remove the particles therefrom. Normally provided are a plurality of filter bags extending into the particle collection chamber, each surrounding a clean air outlet, and are supported therein by suitable support cages. Air passes through the filter bags to the clean air outlets which make connection with a clean air discharge chamber. The filter bags may be arranged in any desired array but are normally located in straight line distributions within the particle collection chamber.

For filtering systems to work efficiently, it is necessary to repeatedly remove particle build up on the outside of filter bags, with the particles thus removed being collected and removed from a base zone of the particle collection chamber. One known arrangement for removing the aforesaid particle build up is to direct a reverse pulse of pressurised air which passes from discharge holes in a blow tube located within the clean air discharge chamber into the mouth of each filter bag. The reverse air pulse rapidly expands the bag to dislodge the particle build up. To increase the air flow in the reverse pulse it has also been proposed to use various forms of venturi arrangements on or adjacent to the mouth of the filter bag. In one known arrangement of this kind, the venturi provided extends into the top section of the filter bag.

Known cleaning arrangements of the aforementioned kind are believed to have a number of inefficiencies caused by differing factors. One such factor is apparently minor irregularities in the form of the discharge holes in the blow tube or tubes. Further, since a free air stream tends to expand conically, the reverse air pulse should be as accurately as possibly positioned coaxial with, and aligned with, the central axis of the filter bag. Misalignment can cause a greater effect on one side of the filter bag than the other with the ultimate effect being that one side of the filter bag may be over cleaned whilst the other may not receive any cleaning effect at all.

A still further inefficiency arises from the structure of bag house filter systems where a plurality of bag filters are supplied with cleaning air released into one end of a usual type of blow tube open at one end and closed at the other with discharge holes being located at spaced locations in line along the tube. Typically air flow volume and direction through the first discharge hole may be vastly different to air flow volume and direction through the last discharge hole from the air supply and of the blow tube. This causes significant differences in cleaning between the various bag filters supplied with reverse pulse cleaning air along the length of one blow tube.

Finally it has been recognised that in those arrangements where a venturi extends into a filter bag, zones of the filter bag adjacent to the venturi outlet will not have full cleaning effect from a reverse pulse air flow.

Variations in the uniformity of cleaning arrangements of the aforementioned kind have the effect of requiring increased filter bag filtering surface areas and/or increased levels of consumption of reverse pulse air flow. This has the effect of increasing the size and capital costs of any bag house filter installation as well as increasing operating costs (due in part to decreased bag life) because of the increased reverse pulse air flows.

OBJECT OF THE INVENTION

The present invention has for its objective, the provision of a cleaning system, or of parts of a cleaning system, for a bag house filter which will minimise variations in cleaning or increased costs caused by one or more of the aforementioned factors.

SUMMARY OF THE INVENTION

According to a first aspect, the present invention provides a nozzle for a bag house cleaning system, said nozzle being of the type to direct air exiting from a blow-tube, said nozzle having an inlet port at one end, and an outlet port at another end and a passage there between, characterised in that said inlet port is of cross sectional area greater than the cross sectional area of the smaller of the outlet port or said passage, the smaller cross sectional area being defined as a control formation for the nozzle which defines a flow characteristic of the nozzle.

A flow characteristic can include, but is not limited to any one of or a combination of the following: the direction of the flow; the volumetric flow rate; velocity or speed of the flow; the velocity profile of the flow; the shape of the air stream exiting the nozzle; the capacity or capability of the flow.

The nozzle can be a single piece nozzle or it can also be, for example, a nozzle assembly which includes a nozzle insert which includes the inlet, outlet and the control formation. Throughout the specification and claims, the words "nozzle" and "nozzle assembly" can be interchanged.

According to another aspect, the present invention provides a nozzle for a bag house cleaning system, the nozzle of the type to direct air exiting from a blow tube, the nozzle having an inlet port at one end, and an outlet port at the other end and a flow control formation located at either end or therebetween to cause air flowing therethrough to assume a predetermined flow characteristic.

This nozzle can be further characterised in that said inlet port has a cross sectional area which is different to that of the cross sectional area of the outlet port or said control formation.

According to a further aspect, the present invention provides a nozzle for directing a pulse of air into a filter bag in a bag house filtering system, the nozzle having a passage connecting an inlet end to an outlet end, the inlet end being adapted to be connected to an outlet hole of a blow tube and having an effective cross sectional area larger than the cross sectional area of the outlet hole. Conveniently a seal means provides a sealing effect at an outer surface of the blow tube surrounding the outlet hole. Such an arrangement permits the outlet holes in a blow tube to be relatively large and conventionally drilled without any need to precisely locate and finish the holes. Because of the relatively large size of the holes they will not have an adverse effect on discharge coefficients and flow efficiencies from the nozzles. The tolerances on positioning and alignment of the discharge holes can be increased. Preferably the blow tube outlet hole has a cross sectional area which is at least 15% greater than the cross sectional area of the inlet end of said nozzle.

According to a further aspect of the present invention, there is provided a mounting system for securing a nozzle to a blow tube in a bag house cleaning system, the nozzle adapted to direct air into a mouth zone of a filter bag, the mounting system including releasable securing means which, when released, allows the nozzle to be aligned relative to the mouth zone of the filter bag or allows removal of the nozzle from the blow tube, or allows an internal component of the nozzle to be replaced.

When the nozzle is released an internal component such as a nozzle insert can be replaced or the whole nozzle removed and replaced with another. Such arrangement allows the nozzle, or any individual nozzle in an array of such nozzles secured to a blow tube, to be correctly aligned (circumferentially with respect to the blow tube). Preferably the releasable securing means further permits axial adjustment relative to the blow tube to allow for correct positioning relative to the filter bag mouth zone. Conveniently a venturi might be provided aligned with and located outwardly of the filter bag mouth zone and in which case, the axis of the nozzle would optionally be aligned with the axis of the venturi. By adjusting the nozzle into the best possible alignment, optimum cleaning from that alignment will result.

According to a still further aspect, the present invention provides a reverse pulse cleaning system comprising a nozzle or a nozzle assembly for connection to a supply of compressed primary air, said nozzle assembly including passage means for a flow of secondary air to enter said nozzle assembly and augment with said primary air. It is preferable that the passage means comprises a port or ports which can have associated therewith a control or restriction means to vary the size of the ports, to enable controlling the amount of secondary air entering said passage means. The passage means may allow entry of secondary air before or after the primary air exits a nozzle outlet which is associated with a control formation.

A passage means can also be provided to enable a flow of tertiary air to enter the stream passing from or through said nozzle assembly.

Preferably said tertiary air and the combined said primary and secondary air stream combine in a venturi.

According to yet another aspect of the present invention, there is provided a reverse pulse cleaning system comprising at least one blow tube adapted for connection to a supply of compressed air and having a plurality of outlet holes therein, which in use direct air towards filter bags, and at least two nozzles associated with the outlet holes, wherein one of the nozzles includes a control formation which is different to that of the other nozzle or nozzles.

Preferably, the nozzles are releasably secured to the or each blow tube. By this arrangement it is possible to provide nozzles having selected control formations permitting substantially equal flow into each bag regardless of its position along the blow tube or in the system. Releasability of the nozzles allow the nozzles of the system to be adjusted if necessary to optimise air flows. These adjustments can be made at the time of installation or after the bag house has been commissioned, at which time further fine tuning adjustments may be accomplished.

Preferably said system also utilises secondary air added to an airstream passing through said nozzle, before said airstream passes out of said nozzle.

Preferably said system includes at least one venturi located outside of the filter bag through which said airstream passes before entering a filter bag to clean same.

Preferably the last such venturi through which air passes before entering the mouth of a filter bag has a maximum cone angle of 20°.

Preferably said system utilises a nozzle having a minimum cross sectional area which is used to modify the flow characteristics of the system at respective outlet holes of said blow tube.

Preferably each one of said outlet holes of said blow tube is of a size which has no effect on a discharge coefficient of the respective nozzle associated with each hole.

Preferably the CSA (cross sectional area) of the outlet hole of the blow tube is less than the effective CSA of the inlet to the nozzle.

Preferably the CSA (cross sectional area) of the inlet of the nozzle insert is less than the CSA of the blow tube outlet hole and the effective inlet to the nozzle.

Preferably the CSA (cross sectional area) of a control formation of the nozzle insert or nozzle is less than the CSA of the inlet of the nozzle insert or nozzle. The control formation can be the outlet, the inlet or located adjacent or next adjacent thereto.

According to a further aspect of the present invention, there is disclosed a nozzle assembly for a bag house cleaning system, the nozzle assembly being adapted to be attached to a blow tube and includes an exchangable flow control means to permit substitution by another flow control means having a different control formation to control air passing through the nozzle assembly.

According to a further aspect of the present invention, there is disclosed a nozzle assembly for a bag house cleaning system, the nozzle assembly being adapted to be attached to a blow tube and including a variable air flow control means, the variable air flow control means being at least one adjustable secondary air inlet port which controls induction of secondary air into the nozzle assembly.

According to a further aspect of the present invention, there is disclosed a nozzle assembly for a bag house cleaning system, the nozzle assembly being adapted to be attached to a blow tube and including at least one secondary air inlet port which allows induction of secondary air into the nozzle assembly upstream of an outlet associated with a control formation in the nozzle assembly.

According to a further aspect of the present invention, there is disclosed a nozzle assembly for a bag house cleaning system, the nozzle assembly being adapted to be attached to a blow tube and having an air flow control means, being at least one secondary air inlet port which allows induction of secondary air into the nozzle assembly after air flow exits an outlet associated with a control formation.

By providing the nozzle assembly with replaceable nozzle inserts, or variable secondary air inlet ports, a number of standard nozzle insert holders can be provided and inserts selected at the point of installation. Otherwise, the size of the secondary air inlet ports can be adjusted on site, after assembly. This makes the manufacture and design of whole bag house cleaning systems a process which can be performed at a location which is not the site of the bag house, and final "tuning" of the system can be made a relatively easy task.

BRIEF DESCRIPTION OF THE DRAWINGS

Embodiments of the present invention will now be described by way of example only with reference to the accompanying drawings in which.

DETAILED DESCRIPTION OF THE DRAWINGS

Figure 1:
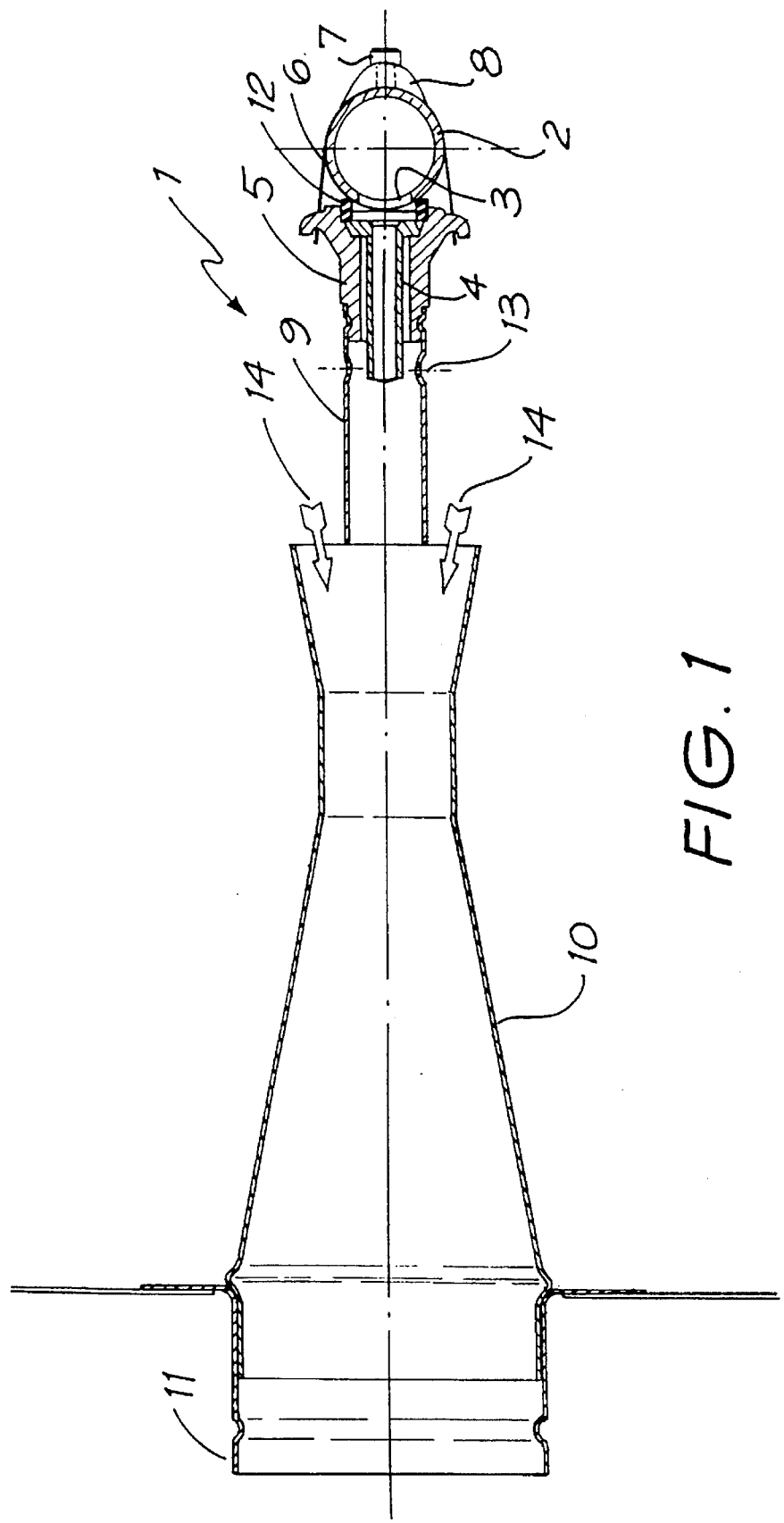
FIG. 1 illustrates a bag house cleaning apparatus according to a first embodiment of invention in sectional view.

Illustrated in FIG. 1 is a bag house filter cleaning apparatus which includes a nozzle assembly 1 attached to a blow tube 2, which has a blow tube outlet hole 3, which is in fluid flow communication with a nozzle insert 4.

The nozzle insert 4 can be removably located in a nozzle adaptor 5 which is adjustably positioned and retained against the blow tube 2, by means of a strap 6, a locking cap screw 7 and a strap connector 8.

The nozzle adaptor 5 has connected to it a nozzle tube 9. Nozzle tube 9 passes into a venturi 10, the exit end 11 of which engages the mouth of a filter bag (not illustrated). The filter bag is attached to exit end 11 by any conventional manner so that the air stream coming out of venturi 10 will act upon the whole of the filter bag. The cone angle of the venturi 10 is 20°, but angles in the range of 5° to 25° can be used.

Figures 3A, 3B:
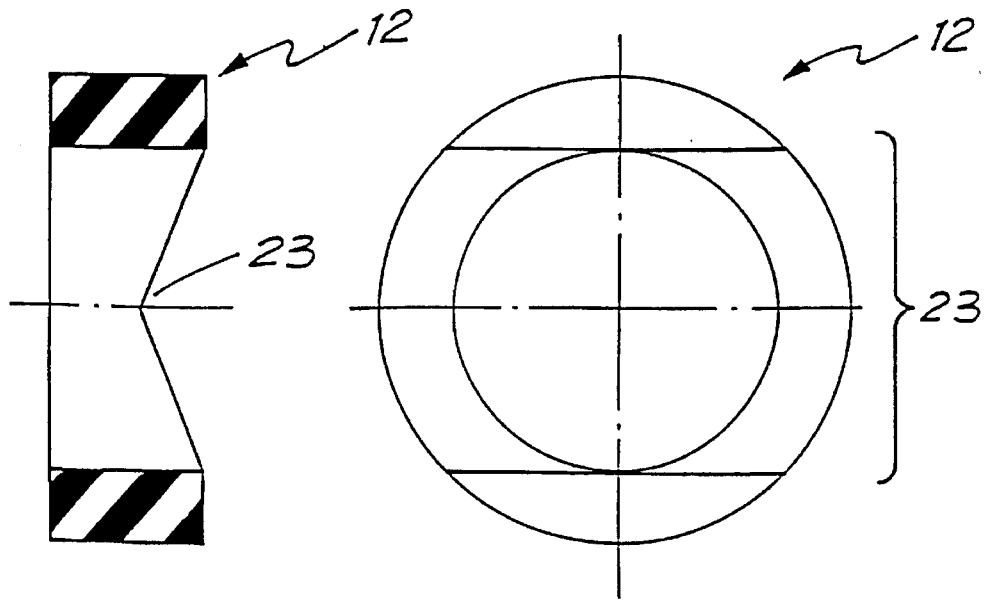
FIGS. 3A and 3B illustrate, respectively, elevational and sectional views of a seal for use with the apparatus of FIG. 1.

Between blow tube 2 and nozzle adaptor 5 is a specially formed seal 12, which seals the blow tube outlet hole 3 to the inlet 15A of the nozzle assembly 1. The seal 12 is of a simple construction, yet its flexibility allows it to be adapted to a variety of blow tube sizes and a variety of outlet hole sizes 3 in the blow tube 2. The seal 12 can be formed from any appropriate material having sufficient flexibility, such as rubber, neoprene and the like. The periphery of blow tube outlet hole 3 is effectively sealed by the seal 12 which is more clearly illustrated in FIG. 3. The seal 12 as illustrated in FIG. 3, has an angled cut away portion 23 which allows the seal 12 to effectively operate in conjunction with different size blow tubes 2 and nozzle arrangements.

The nozzle tube 9 has provision, by means of circumferentially positioned secondary air inlet ports 13, to allow induction of secondary air into the nozzle assembly 1. The secondary air inlet ports 13 can be adjustably occluded by a variable throttling means (described later in respect to FIG. 9). As primary plus secondary air exits the nozzle tube 9, further air, termed "tertiary" air may be induced into the air flow through a gap located around nozzle tube 9 and between the entrance to venturi 10. This gap is indicated by the presence of arrows 14 showing the direction of tertiary air entry.

Figure 2:
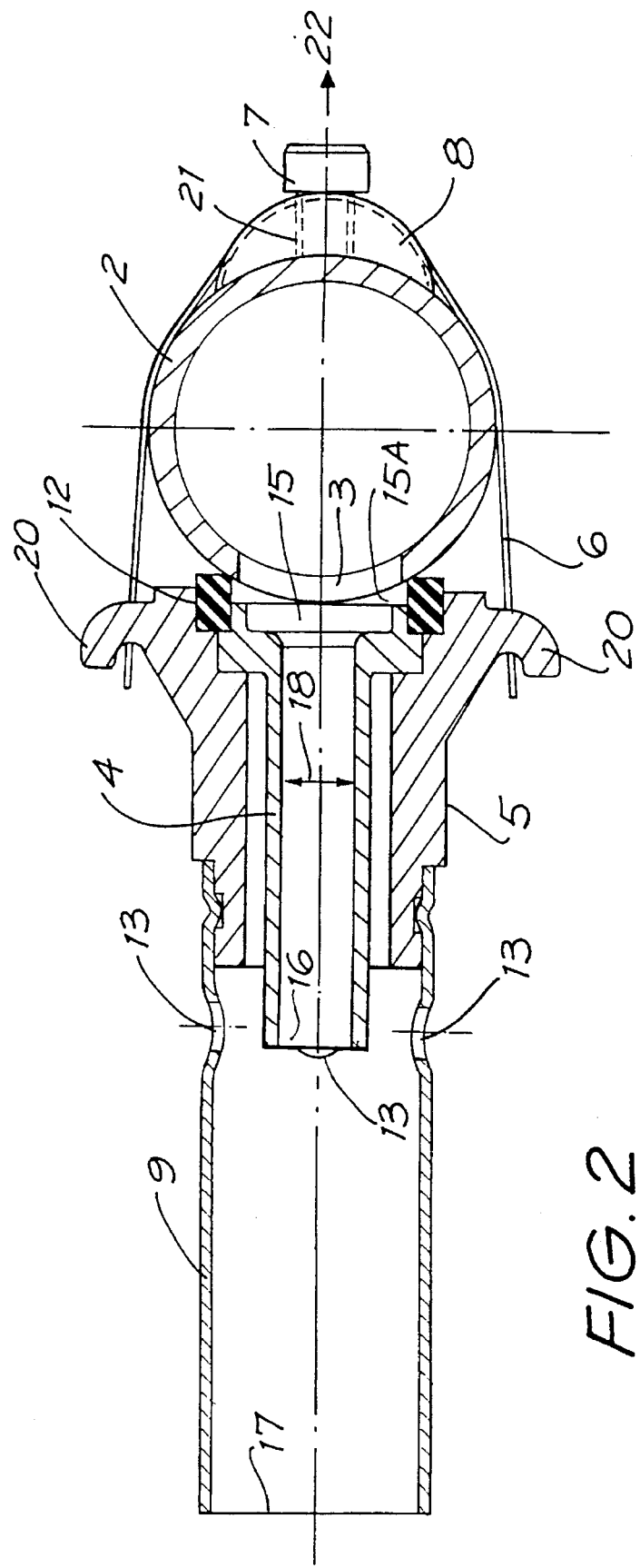
FIG. 2 illustrates a detailed sectional view of part of the apparatus of FIG. 1.

More clearly illustrated in FIG. 2 is the relationship between the blow tube outlet hole 3 and the nozzle insert 4. The blow tube outlet hole 3, is clearly illustrated larger in size than the nozzle insert inlet port 15 of the nozzle insert 4. The "effective" cross sectional area of the inlet 15A to the nozzle assembly 1 is defined by the inside diameter of the seal 12, which is larger than the blow tube outlet hole 3.

The provision of a blow tube outlet hole 3 being larger than the nozzle insert inlet port 15, will, during a bag cleaning phase, result in extremely high velocity air coming out of the blow tube hole 3 having its direction and flow rate characteristics properly controlled by the nozzle insert 4. Some of the other characteristics that can be controlled include the volumetric flow rate, the velocity or speed of the flow, the pressures, the velocity profile, the share of the air stream exiting the nozzle and the flow capacity and capability. This is in contrast to prior art systems, in which air exited the holes in a blow tube with unequal and inconsistent velocity, the absence of precise control of the flow rate and direction leading to unequal and inconsistent cleaning of the filter bags.

As air passes in use through the nozzle insert 4, and exits same through outlet port 16, secondary air is drawn in through secondary air inlet ports 13 around the circumference of the nozzle tube 9. This air stream can be further increased by induced tertiary air which enters the system in the direction of arrows 14 (see FIG. 1) as the air exits the nozzle tube 9 and enters the venturi 10. By the addition of secondary and tertiary air an increase in the volume of air of a factor of up to 2 to 1 to 3 to 1, can be added to the airstream entering the venturi 10 when compared with air exiting the blow tube 2.

In prior air systems discrepancies in the flow characteristics exist in the air flow exiting at different positions along a single blow tube. With the present invention, different nozzle inserts 4 can be selected for these different positions having different control formations 18. The control formations 18 will be selected according to the effect that is desired. In the illustrated embodiments the control formations 18 are made up of appropriately sized control diameters 18 to enable even cleaning of the filter bags along any one row fed by a single blow tube. By controlling the variation between nozzles, effective cleaning will result, and effective use of energy consumed will also result.

Figure 4:
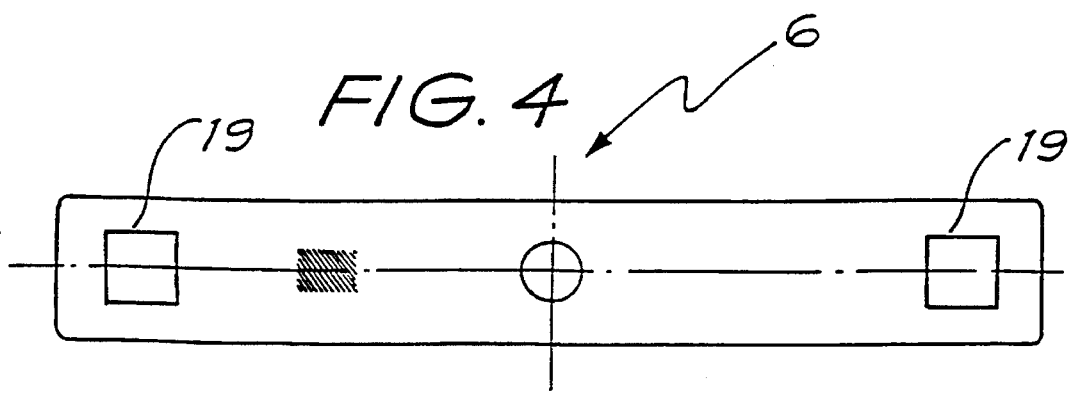
FIG. 4 illustrates a strap for use with the apparatus of FIG. 1.

The nozzle assembly 1 can be clamped to the blow tube 2 by means of a retaining clip or strap 6, which is more clearly illustrated in FIG. 4. The strap 6, is made up of a flexible ribbon or strip of metal having two holes 19 which engage projections 20 on nozzle adaptor 5. In the centre of the strap 6, is a hole through which a locking cap screw 7 passes. The strap connector 8 has a threaded bore 21, which engages the thread on locking cap screw 7 and allows the locking cap screw 7 to bear against the circumference of the blow tube 2. As locking cap screw 7 is tightened, the strap connector 8 is forced in the direction of arrow 22, thereby tensioning the strap 6, and forcing the nozzle adaptor 5 towards the blow tube 2, thereby compressing the seal 12.

The cap screw 7 and strap connector 8 provides an arrangement to replace or release and align the nozzle assembly 1 or to experiment with different size control diameters for nozzle inserts 4.

Figure 5:
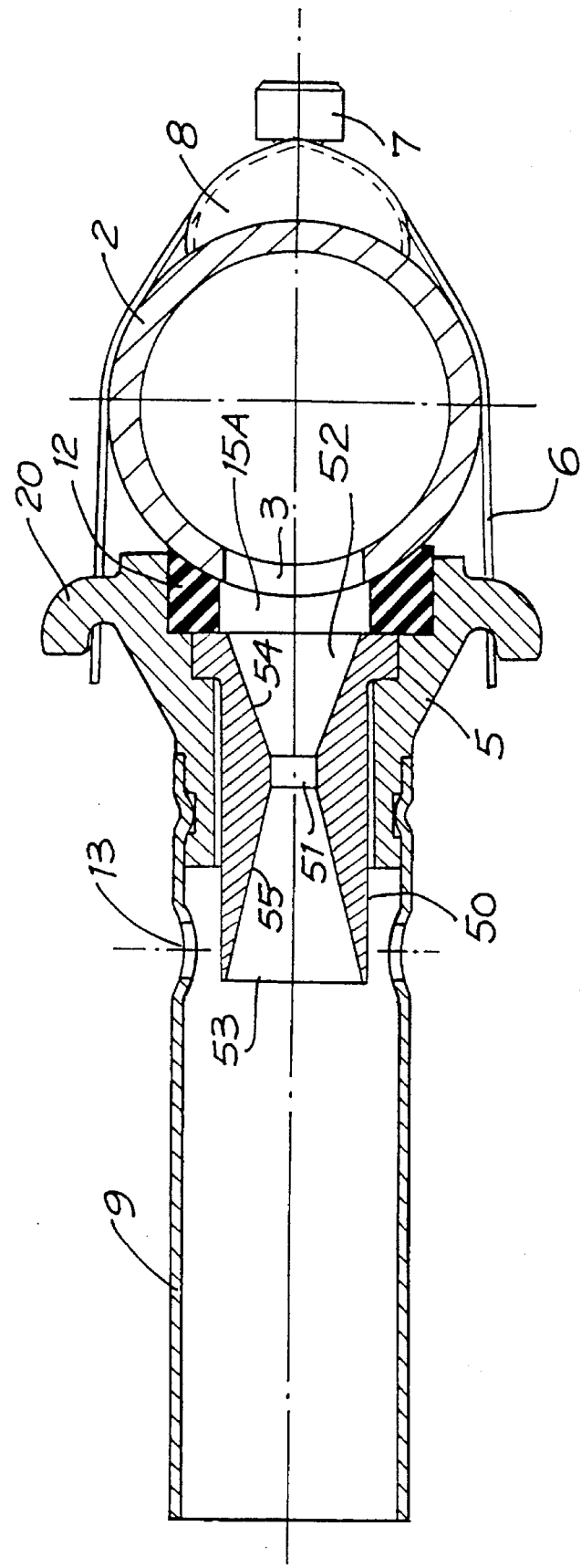
FIG. 5 illustrates a detailed sectional view of a second embodiment of the present invention.

Illustrated in FIG. 5 is a second embodiment, which is similar to that of FIG. 1. Parts which are common with FIG. 1 have been like numbered. The nozzle insert 50 is of a different construction to the embodiment of FIG. 1. It consists of a venturi having a control formation 51 which is located between the inlet end 52 and outlet end 53. The inlet end 52 has a tapered/conical passage 54 which reduces down to the control formation 51. Likewise, a tapered/conical exit passage 55 connects control formation 51 and outlet end 53.

Figure 6:
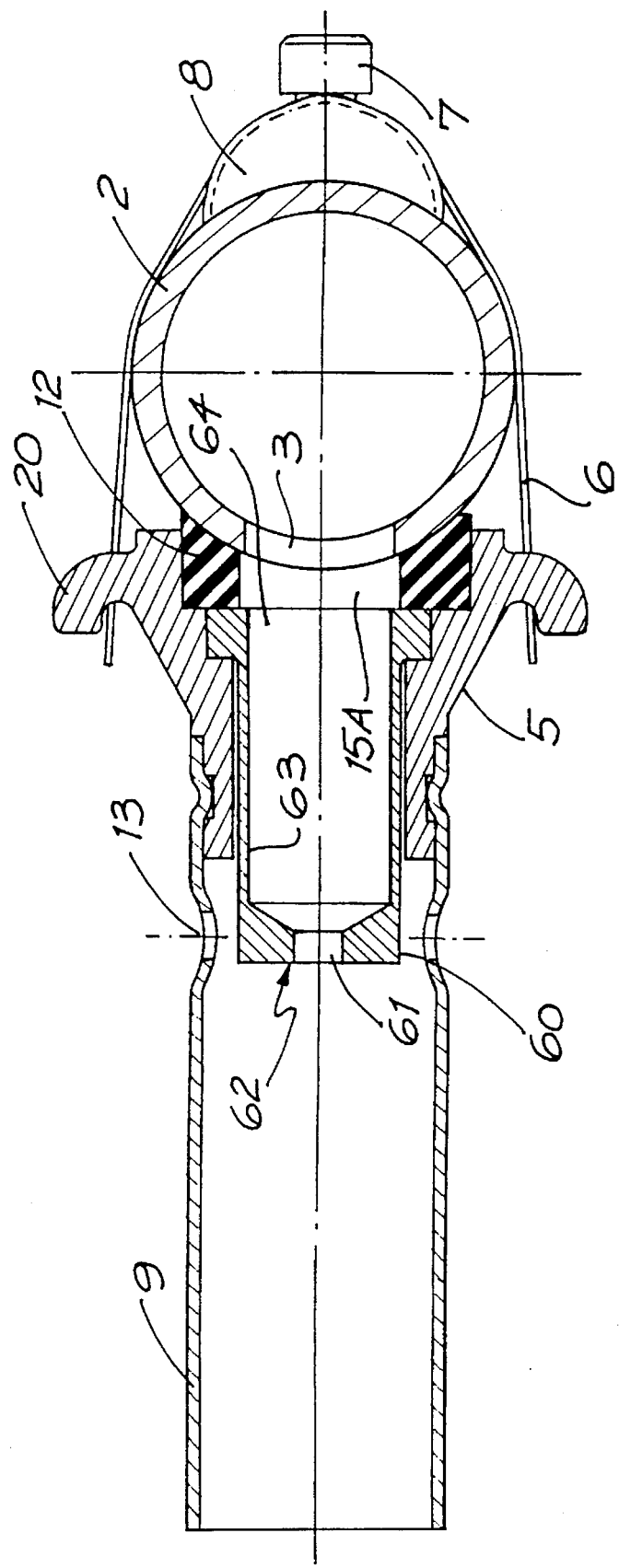
FIG. 6 illustrates a detailed sectional view of a third embodiment of the present invention.

Illustrated in FIG. 6 is a third embodiment, which is similar to that of FIG. 1. Parts which are common with FIG. 1 have been like numbered. The nozzle insert 60 has a control formation 61 which is located at the outlet end 62 of the nozzle insert 60. The inlet end 64 and passage 63 which connects the inlet end 64; to the control formation 61 is of a constant size.

Figure 7:
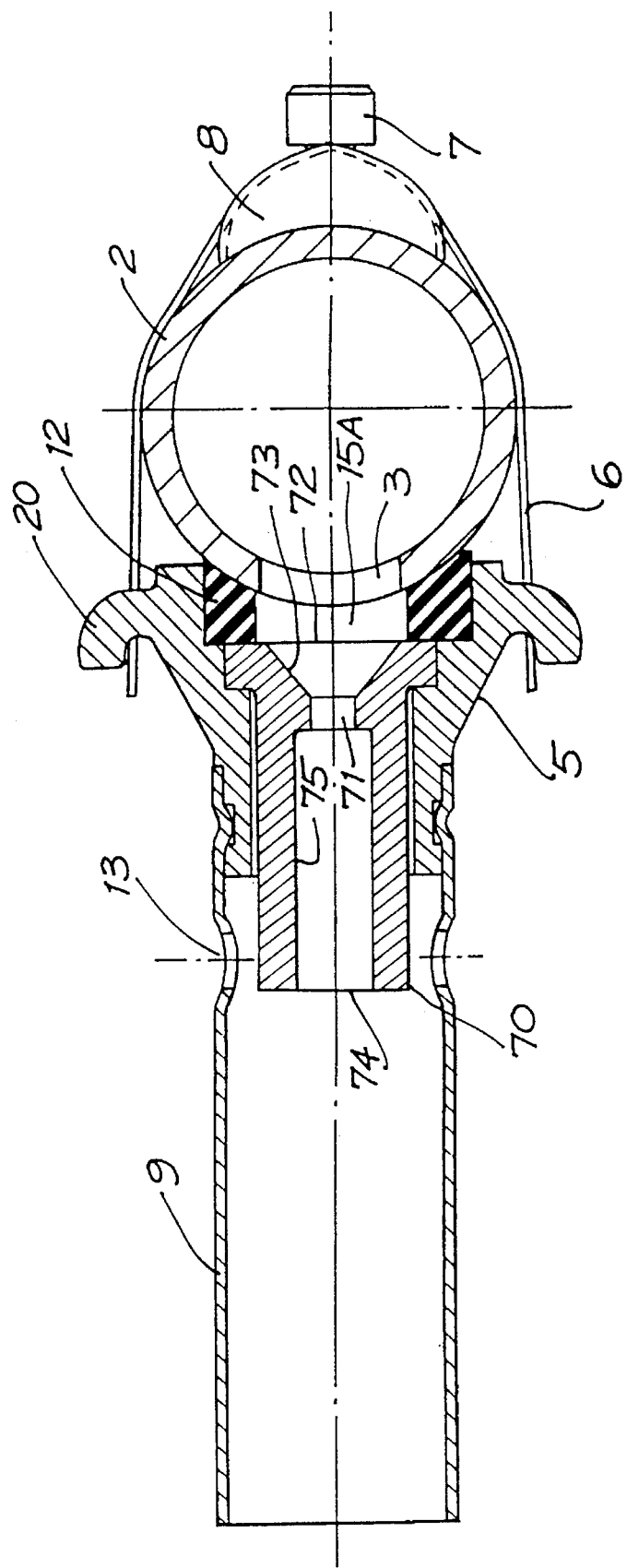
FIG. 7 illustrates a detailed sectional view of a fourth embodiment of the present invention.

Illustrated in FIG. 7 is a fourth embodiment, which is similar to that of FIG. 1. Parts which are common with FIG. 1 have been like numbered. The nozzle insert 70 of this embodiment has a control formation 71 which is located in close proximity to the inlet end 72. The inlet end 72 is connected by a tapered/conical passage 73 to the control formation 71. On the outlet side of the nozzle insert 70 is the outlet end 74 which is connected by means of a passage 75 having a constant cross sectional area, which is a counter bore with respect to the control formation 71.

Figure 8:
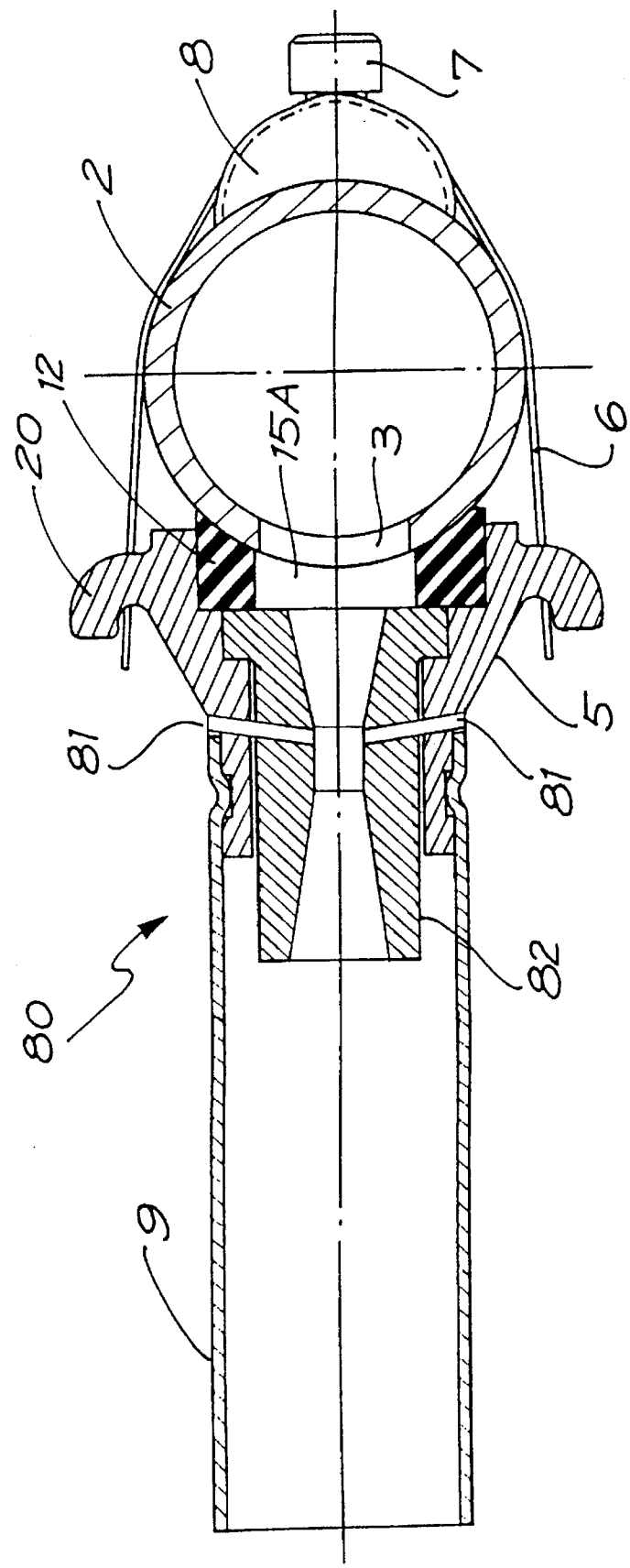
FIG. 8 illustrates a detailed sectional view of a fifth embodiment of the present invention.

FIG. 8 represents a fifth embodiment which is constructed in a similar manner as the previous embodiments. The nozzle assembly 80 utilises some components and features which are similar to those of previous embodiments and have been like numbered accordingly. The nozzle assembly 80 differs from previous embodiments in that secondary air inlet ports 81 allow induction of secondary air into the air stream which will exit the nozzle assembly 80. In this embodiment, the secondary air enters the nozzle assembly 80 via the nozzle insert 82. The nozzle insert 82 is a venturi which will draw secondary air into the air stream passing through the venturi. It will be noticed that the nozzle tube 9 does not include ports as in the other embodiments.

Figure 9:
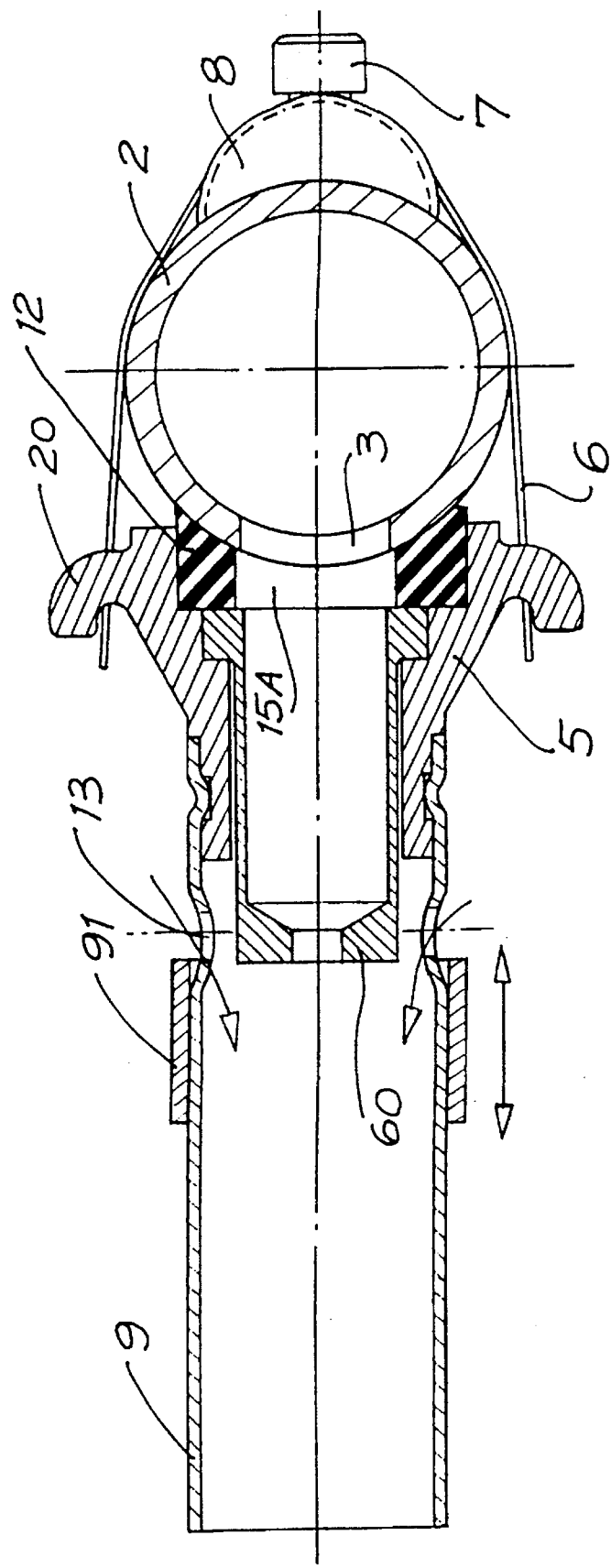
FIG. 9 illustrates a detailed sectional view of a sixth embodiment of the present invention.

FIG. 9 illustrates a sixth embodiment which is similar to that of FIG. 6. Similar parts have been like numbered. This embodiment includes on the nozzle tube 9 an axially adjustable sleeve 91 which is capable of closing or partially closing the secondary air inlet ports 13. This embodiment will control the volume of the air flow exiting the nozzle assembly by controlling the amount of secondary air which will enter the air stream. This embodiment may be utilised with a single size of nozzle insert 60, which need not vary in the bag house. As the flow characteristics can be controlled at individual nozzles, each nozzle can be fine tuned to adjust for its position along the blow tube. Alternatively instead of using an adjustable sleeve 91 some of the secondary air inlet ports 13 may be fully or partially closed off by means of any suitable plug or cover such as a sleeve with like secondary air inlet ports 13 which is rotated on nozzle tube 9 rather than axially moved. The nozzle tube 9 can also be provided, at the point of manufacture or another location, with a predetermined number of holes of selected sizes according to the range of flow characteristics which are to be achieved.

Figure 10:
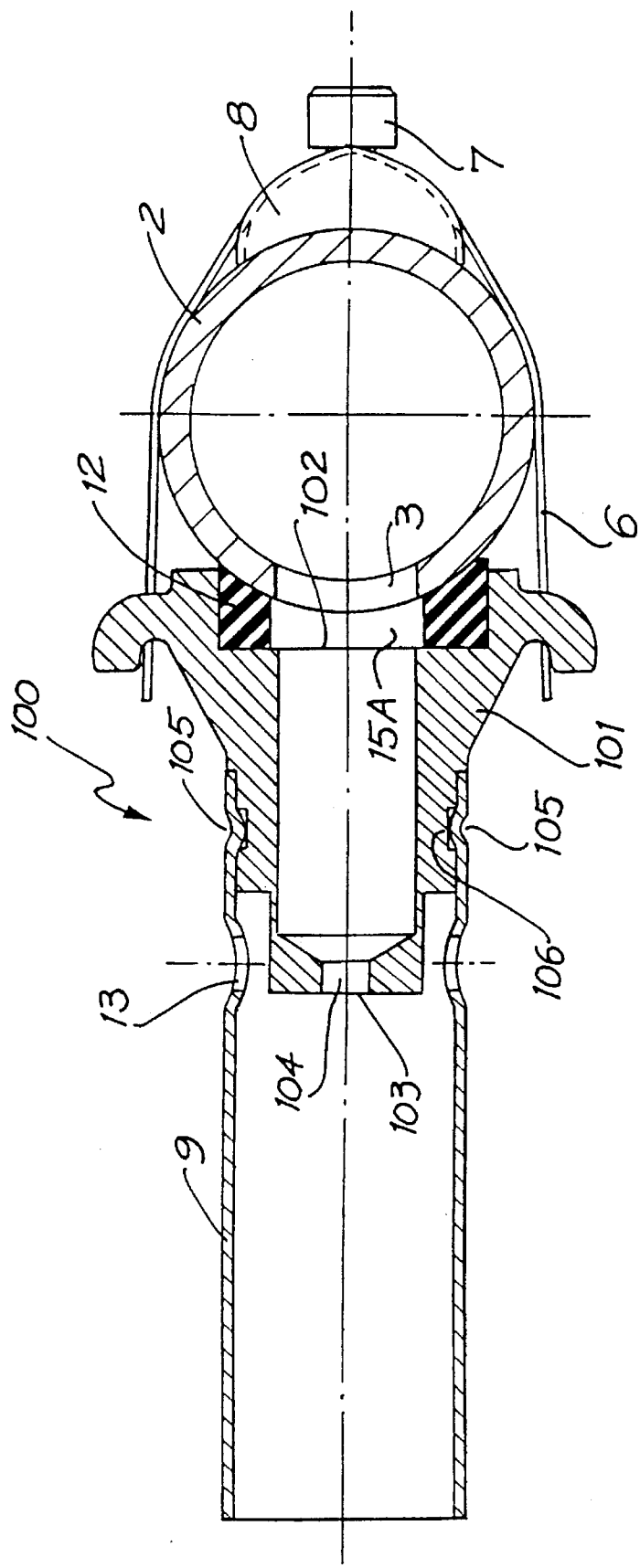
FIG. 10 illustrates a detailed sectional view of a seventh embodiment of the present invention.

FIG. 10 illustrate a seventh embodiment which is similar to that of FIG. 6. Similar parts have been numbered with like numerals. This nozzle assembly 100 is constructed from three components. A nozzle tube 9 is swaged at 105 (or other cold forming process) onto a groove 106 on the nozzle adaptor 101. The nozzle adaptor 101 also incorporates the nozzle components of the inlet passage 102, outlet passage 103 and the control formation 104, which are all integrally moulded. FIG. 10 also illustrates a seal 12 which is the third component. As a further possibility (not illustrated),by integrally moulding the nozzle adaptor 101 with the nozzle tube 9 and including the nozzle air passages and control features, only a seal 12 will need to be added, in order to produce a functional two piece nozzle assembly (excluding mounting means).

Figure 11:
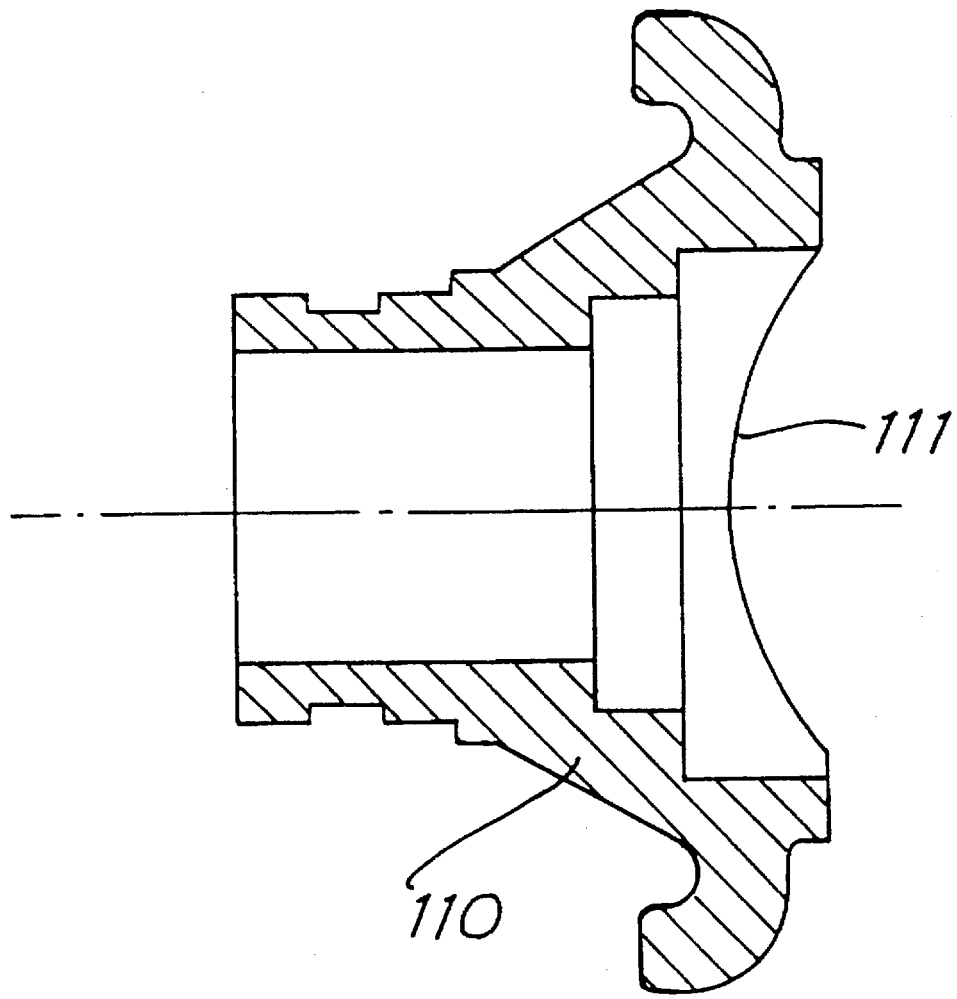
FIG. 11 illustrates a sectional view of an alternative nozzle adaptor.

If a one piece construction is required (that is to remove the need for a separate seal 12), a nozzle adaptor 110 as illustrated in FIG. 11 can be utilised. The a nozzle adaptor 110 has a curved inlet end 111 which can be attached directly to a blow tube with out the need for a seal. Whilst some leakage may occur, it will not be significant enough to affect the performance and operation of the bag house system. The preferred materials for the construction of the nozzle components is aluminium or an alloy thereof, however any suitable material can be utilised. For example, if a single piece nozzle assembly is moulded out of plastics material, and the curved inlet end 111 is also incorporated, then, if a material having some flexibility is selected, the curved inlet end 111 will make satisfactory seal with the blow tube to which it is connected.

As a further possibility (not illustrated) the nozzle tube and nozzle adaptor may be moulded as one piece into which a nozzle insert the required control formation can be inserted, as can a seal if required.

Figure 12:
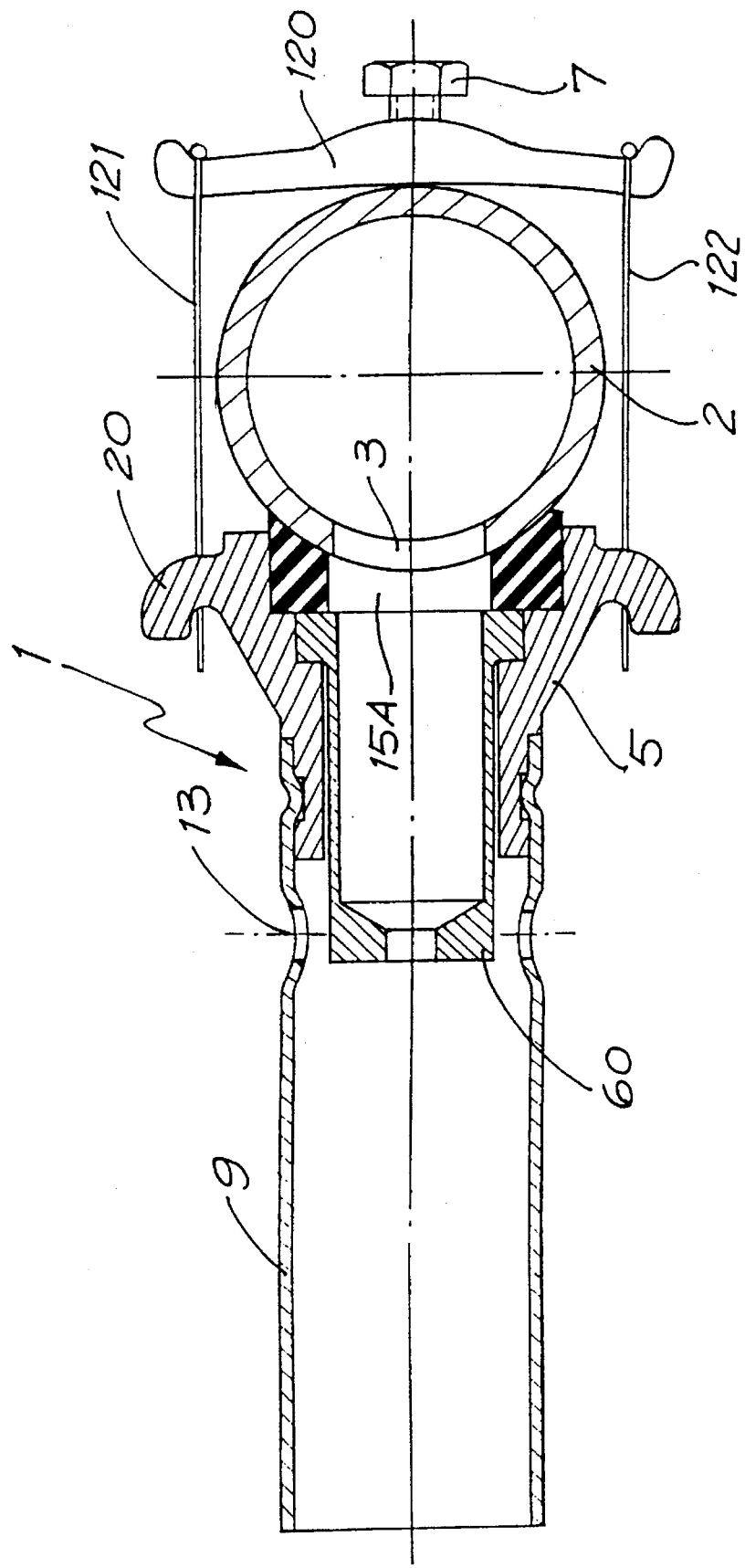
FIG. 12 illustrates an alternative attachment means to the apparatus of FIG. 2.

Illustrated in FIG. 12 is an alternative attachment mechanism to releasably secure the nozzle assembly 1 to the blow tube 2. This mechanism comprises a yoke member 120 having straps 121 and 122 to connect the yoke member 120 to the nozzle adaptor 5. Once the straps 121 and 122 have been loosely assembled, the lockable bolt or locking cap screw 7 is turned to effectively secure the nozzle assembly to the blow tube 2.

Figure 13:
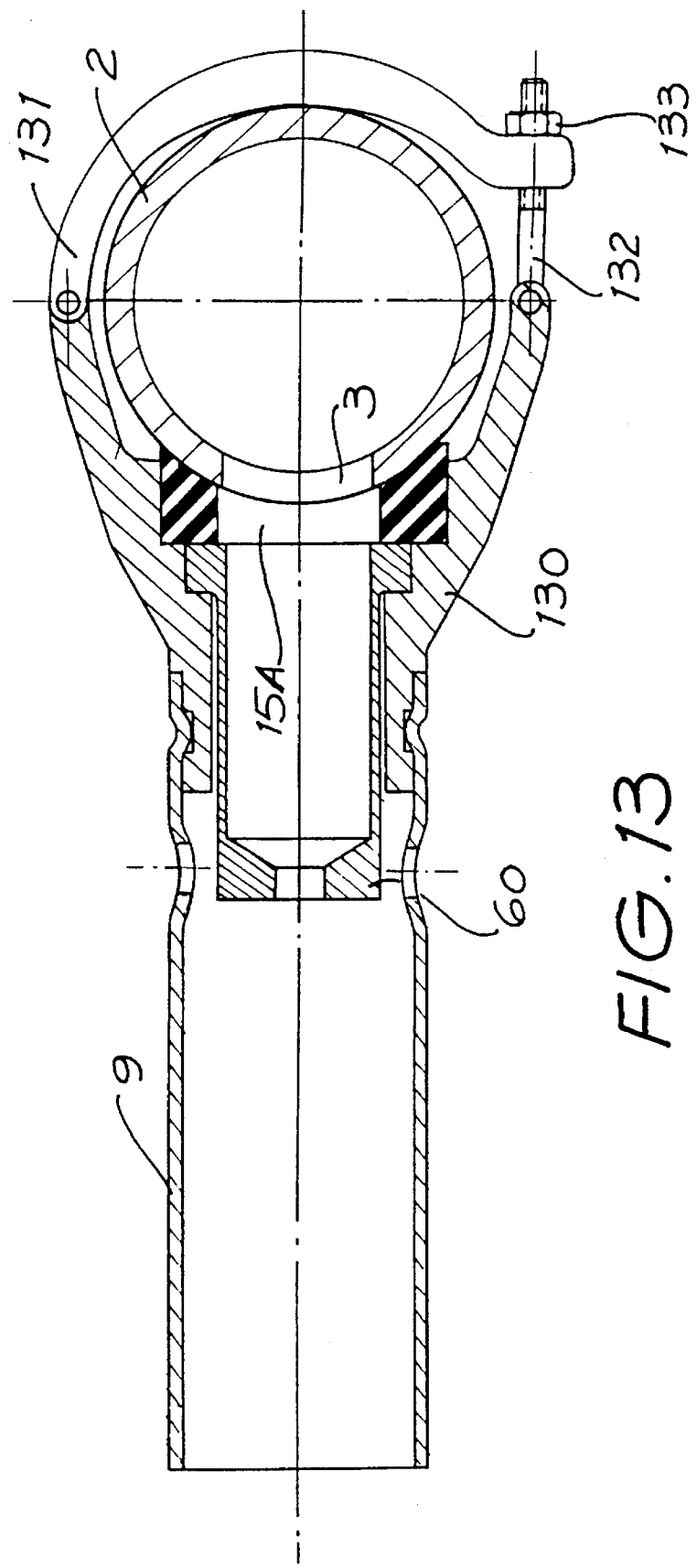
FIG. 13 illustrates a further alternative attachment means to the apparatus of FIGS. 2 and 12.

Another attachment mechanism is illustrated in FIG. 13. A nozzle adaptor 130 having at one side a pinned arm 131 and on the diametrically opposite side a pinned bolt 132. Both pinned connections allow rotation of the respective components. The pinned arm 131 terminates in a section having a bore to receive the pinned bolt 132. The nozzle is secured to the blow tube 2 by the tightening of the nut 133 on pinned bolt 132. Allowance may need to be made, to take into account any rotation which may result, as the nut 133 is being tightened.

Figure 14:
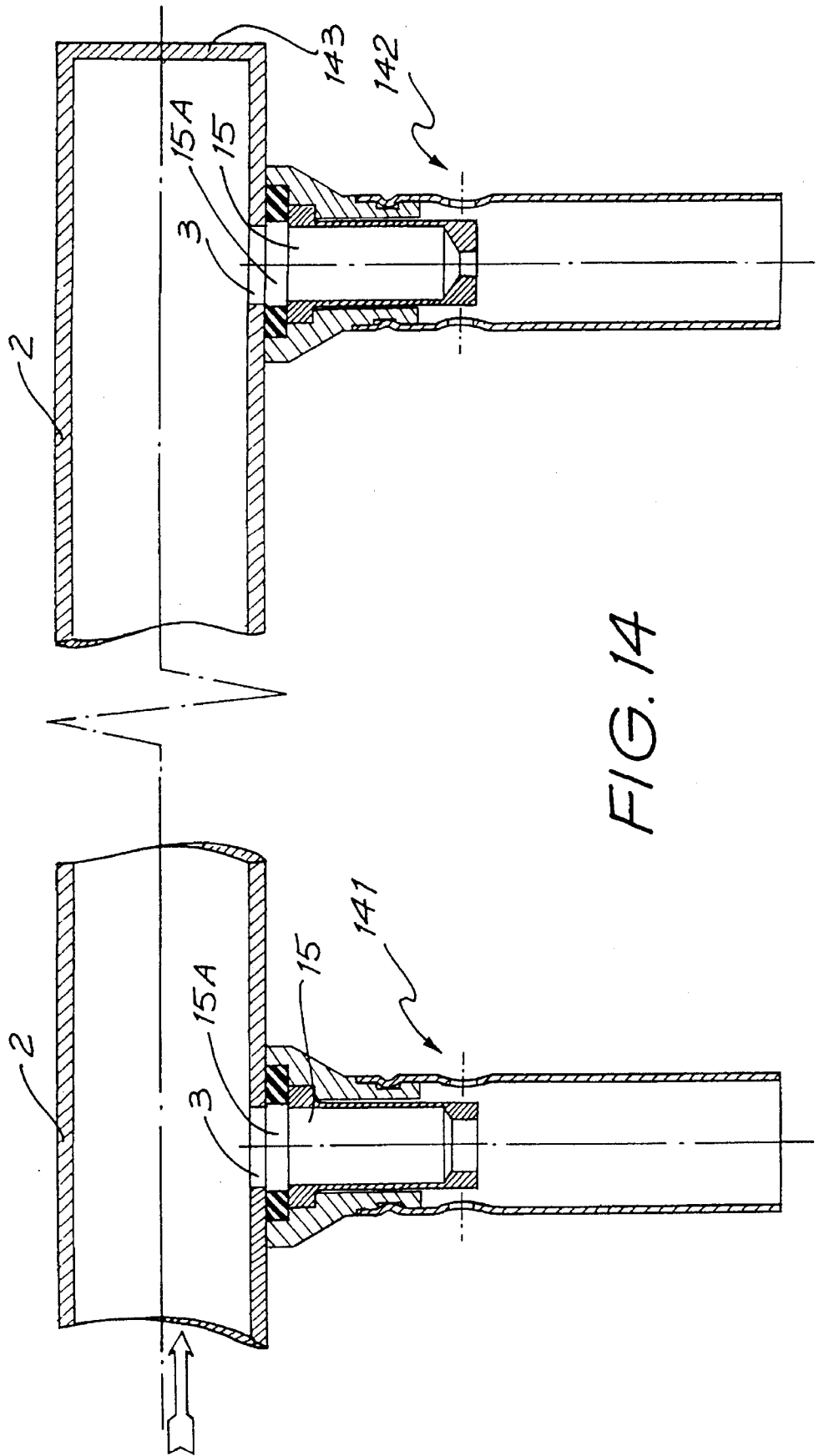
FIG. 14 illustrates in schematic view, a blow tube incorporating an embodiment of the present invention.
Figures 15, 16:
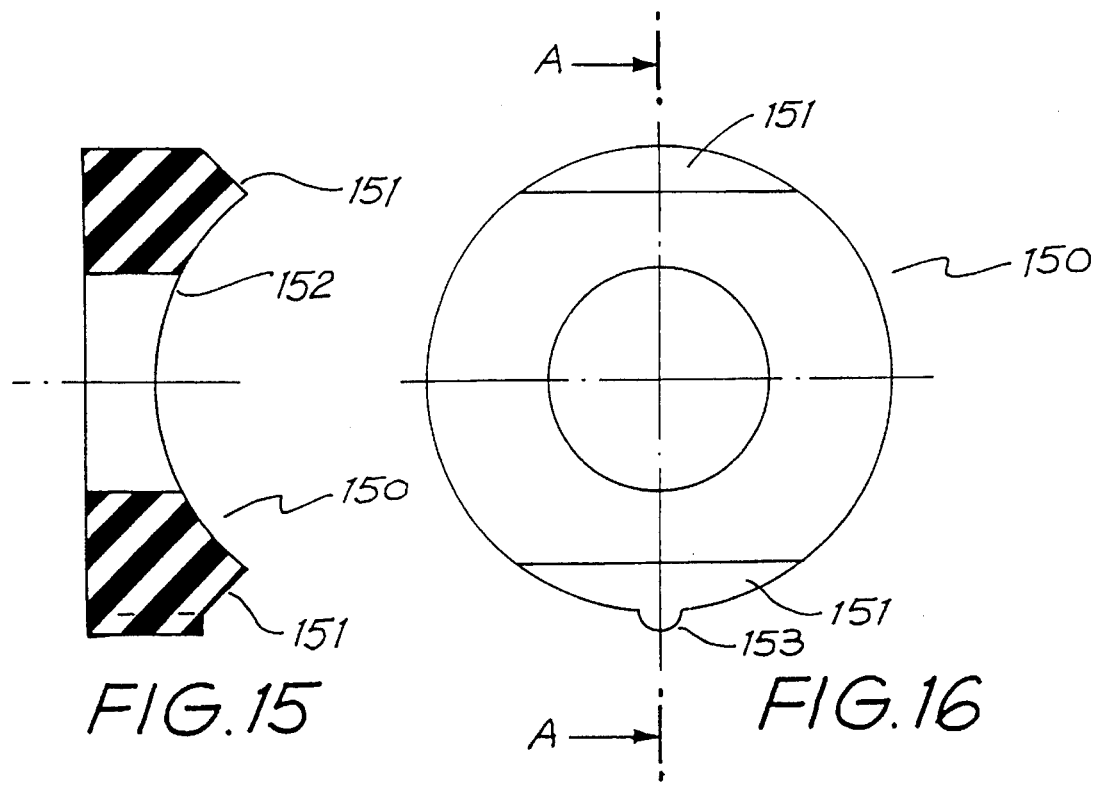
FIG. 15 illustrates a sectional view of an alternative seal means to the seal of FIG. 3.
FIG. 16 illustrates a plan view of the seal of FIG. 15.
Figures 17, 18:
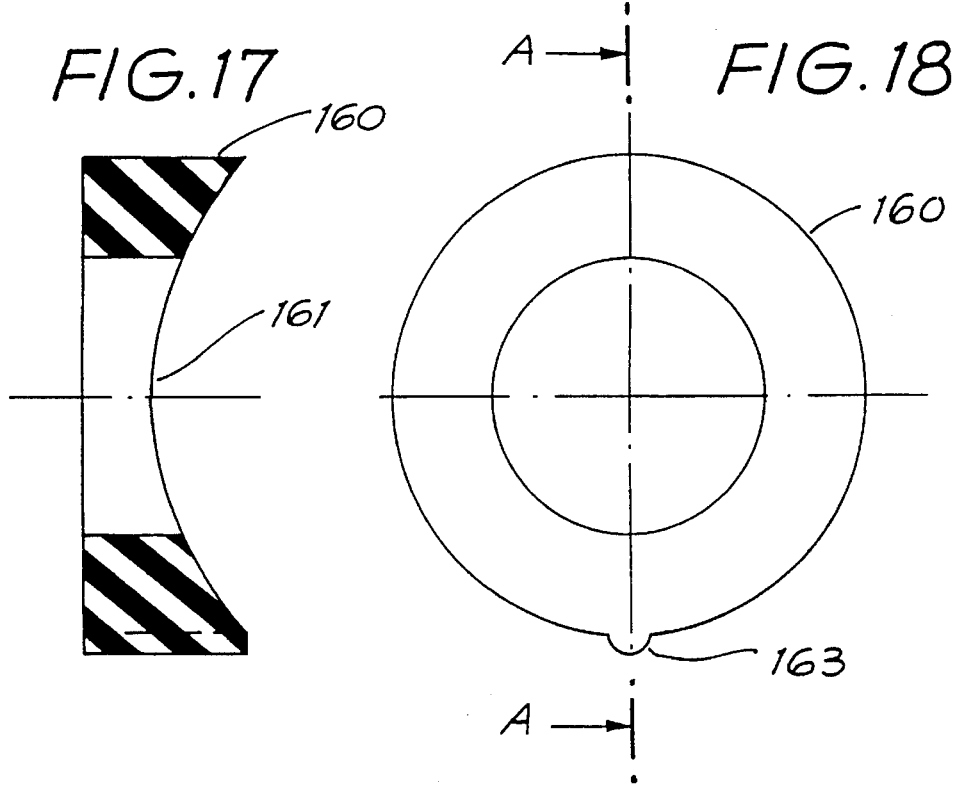
FIG. 17 illustrates in sectional view an alternative seal means to the seals of FIGS. 3 or 15.
FIG. 18 illustrates an plan view of the seal of FIG. 17.

Illustrated in FIG. 14 is a side view of a blow tube 2 which has mounted thereon at least two nozzle assemblies 141 and 142. These nozzle assemblies are secured to the blow tube by any of the means previously described, however those means are not illustrated here for the sake of convenience. The control diameter or area of nozzle assembly 141 is greater than that of nozzle assembly 142 as nozzle assembly 142 is closer to the blanked off end 143 of the blow tube 2. The control area of the nozzle assembly 142 is selected to modify the characteristics of the air flow exiting the nozzle assembly 142 so that it is substantially the same as the flow exiting the nozzle assembly 141. In some situations this may be reversed, that is, the larger control area of the nozzle assembly will be located furthest away from the supply or source of compressed air.

Illustrated in FIGS. 15,16 and 17,18 are seals 150 and 160, respectively, which are alternatives to the seal 12. The seals 150 and 160 have curved sealing surfaces 152 and 161 on their periphery, so that a more precise seal can be effected to the circumference of the blow tube 2. Locating projections 153 and 163 are also provided on the seals 150 and 160, to prevent rotation of the seal as the nozzle assembly is being mounted to the blow tube. Seal 150 can be used for smaller diameter blow tubes, whilst the seal 160 is better adapted for use with larger diameter blow tubes. The seals 150 and 160 have the same outside diameter, as the nozzle assemblies are preferably of only one or two sizes, with each size accepting the same outside diameter seal, with the inside diameter of the seal being selected according to the size of the inlet end of the nozzle insert or the nozzle assembly 1. In the case of seal 150 in FIGS. 15 and 16, as the outside diameter of the pipe is less than the outside diameter of the seal the angular surfaces 151 are provided to terminate or trim the curved sealing surface 152. If such seals 150 and 160 are utilised (that is having a curved sealing surface), a different seal will be needed to match pipes of different diameters (unlike the seal 12 which can be utilised with pipes of differing diameters), as the curved surface will be designed to suit only one diameter pipe.

A bag house cleaning system which ineffectively cleans means that the total surface areas of the bags utilised in the bag house are not always being cleaned and this forces the air to be pumped through at a higher rate in order to maintain the same output of air for which the system was designed.

The ability to easily change a nozzle, nozzle assembly or nozzle inserts stems from the novel manner in which the nozzle assemblies are "strapped" to the blow tube. Further advantages stem from the use of a strapping system in that the alignment of the exit of the nozzle assembly into the venturi can be adjusted. This alignment is a factor in the effective operation of reverse pulse cleaning systems. The use of an oversize outlet hole in the blow tube together with the strapping systems allows the adjustment of the direction of the discharge from the nozzle assembly.

As has been mentioned previously, the use of different size nozzles or nozzle inserts allows the bag house cleaning system to produce a substantially uniform cleaning effectiveness, regardless of the positioning of the filter bag, by providing air flow with appropriate characteristics (quantity, velocity and direction) into the filter bags. The invention well demonstrates that the effectiveness of a bag house cleaning system resides in large measure in the provision of appropriate and accurately directed and shaped air flow into the filter bags, providing a minimum amount of variation between respective bags and from end to end of any one bag. This uniformity can in fact be achieved by varying the amount of air which enters the air stream as secondary air. The variation can be achieved by the provision of nozzles having different sizes of secondary air ports, or in the alternative, secondary air inlet ports whose size of openings are adjustable or controllable.

Modifications by those skilled in the art can be made to the invention without departing from the scope thereof. For example any of the features described above can be combined with each other.

I claim:

1. A filter cleaning system including: a blow tube through which cleaning air flows, said blow tube having an outlet hole through which said cleaning air may exit said blow tube; a gas nozzle including a body having opposite ends and an air passage therethrough, said air passage having an inlet end and an outlet end, means for coupling said body on said blow tube with said inlet end of said air passage in communication with said outlet hole, said inlet end of said air passage having a cross sectional area greater than that of said outlet hole; and sealing means engageable with one of said opposite ends of said body at the inlet end of said air passage and with said blow tube to provide a seal between said inlet end of said air passage and said outlet hole.

2. The filter cleaning system according to claim 1 wherein said air passage is formed by an insert accommodated in said body and said deformable sealing means engaging said insert to provide a seal between said insert and said outlet hole at said one of said opposite ends.

3. The filter cleaning system according to claim 2 wherein said insert projects beyond the other of said opposite ends of said body.

4. The filter cleaning system according to claim 1 including air flow control means within said air passage for producing a predetermined flow characteristic of air flowing through said air passage.

5. The filter cleaning system according to claim 4 wherein said flow control means is exchangeable for another flow control means which produces a different predetermined flow characteristic of air flowing through said air passage.

6. The filter cleaning system according to claim 6 wherein said air flow control means is adjacent one end of said air passage.

7. The filter cleaning system according to claim 1 including secondary air supply ports in communication with said air passage between the inlet and outlet ends thereof.

8. The filter cleaning system according to claim 7 wherein said air passage has a venturi configuration adjacent the communication of said secondary air ports with said air passage.

9. The filter cleaning system according to claim 7 including means for selectively opening and occluding said secondary air supply ports.

10. The filter cleaning system according to claim 9 wherein the means for selectively opening and occluding said secondary air supply ports comprises a sleeve movably mounted on said tube.

11. A filter cleaning system including: a blow tube through which cleaning air flows, said blow tube having an outlet hole through which said cleaning air may exit said blow tube; a gas nozzle including a body having an air passage therethrough, said passage having an inlet end for receiving air exiting said blow tube and an outlet end for discharging air flowing through said air passage; means for coupling said body to said blow tube with said inlet end of said air passage in communication with said outlet hole; and air flow control means occupying said air passage between its ends for producing a predetermined flow characteristic in air flowing through said air passage.

12. The filter cleaning system according to claim 11 wherein said air flow control means is adjacent one end of said passage.

13. The filter cleaning system according to claim 11 wherein said air passage comprises a tubular member removably accommodated in said body.

14. The filter cleaning system according to claim 13 wherein said tubular member may be withdrawn from said body and replaced by another tubular member.

15. A filter cleaning system including: a blow tube through which cleaning air flows, said blow tube having an outlet hole through which said cleaning air may exit said blow tube; a gas nozzle including a body having a bore; a tubular member removably accommodated in said bore and forming an air passage through said body, said air passage having an outlet end and an inlet end; means for coupling said body on said blow tube with said inlet end of said air passage in communication with said outlet hole, said inlet end of said air passage having a cross sectional area greater than that of said outlet hole; sealing means engageable with said body at the inlet end of said air passage and with said blow tube to provide a seal between said inlet end of said air passage and said outlet hole; and air flow control means occupying said tubular member and through which air traversing said air passage must flow, said air flow control means being configured to produce a predetermined flow characteristic of air flowing through said air passage, said tubular member being removable from said body for replacement by another tubular member having air flow control means operable to produce a different predetermined flow characteristic of air flowing through said air passage.

16. The filter cleaning system according to claim 15 wherein said air flow control means occupies said tubular member adjacent that end thereof which is adjacent said blow tube.

17. The filter cleaning system according to claim 15 wherein said air control means occupies said tubular member adjacent that end thereof which is remote from said blow tube.

18. The filter cleaning system according to claim 15 wherein said air control means occupies a position within said tubular member substantially midway between its ends.

19. A gas nozzle solely for a filter cleaning system which includes a blow tube through which cleaning air flows, said blow tube having an outlet hole through which said cleaning air may exit said blow tube; said gas nozzle comprising a body having opposite ends and an air passage therethrough, said air passage having an inlet end and an outlet end, means for clamping said body on said blow tube with said inlet end of said air passage in communication with said outlet hole, said inlet end of said air passage having a cross sectional area greater than that of said outlet hole; and sealing means engageable with one of said opposite ends of said body at the inlet end of said air passage and with said blow tube to provide a seal between said inlet end of said air passage and said outlet hole; said air passage is formed by a tubular insert accommodated in said body and said tubular insert projects beyond that end of said body which is remote from the inlet end of said air passage.

20. A gas nozzle solely for a filter cleaning system which includes a blow tube through which cleaning air flows, said blow tube having an outlet hole through which said cleaning air may exit said blow tube; said gas nozzle comprising a body having opposite ends and an air passage therethrough, said air passage having an inlet end and an outlet end, means for clamping said body on said blow tube with said inlet end of said air passage in communication with said outlet hole, said inlet end of said air passage having a cross sectional area greater than that of said outlet hole; and sealing means engageable with one of said opposite ends of said body at the inlet end of said air passage and with said blow tube to provide a seal between said inlet end of said air passage and said outlet hole; air flow control means occupying said air passage for producing a predetermined flow characteristic of air flowing through said air passage and wherein said air flow control means is substantially midway between the ends of said passage.

21. A gas nozzle solely for a filter cleaning system which includes a blow tube through which cleaning air flows, said blow tube having an outlet hole through which said cleaning air may exit said blow tube; said gas nozzle comprising a body having opposite ends and an air passage therethrough, said air passage having an inlet end and an outlet end, means for clamping said body on said blow tube with said inlet end of said air passage in communication with said outlet hole, said inlet end of said air passage having a cross sectional area greater than that of said outlet hole; and sealing means engageable with one of said opposite ends of said body at the inlet end of said air passage and with said blow tube to provide a seal between said inlet end of said air passage and said outlet hole; a tube connected to said body in prolongation of said air passage and in communication with said outlet end of said passage, said tube having secondary air supply ports therein.

22. A gas nozzle solely for a filter cleaning system which includes a blow tube through which cleaning air flows, said blow tube having an outlet hole through which said cleaning air may exit said blow tube; said nozzle including a body having an air passage therethrough, said air passage having an inlet end for receiving air exiting said blow tube and an outlet end for discharging air flowing through said air passage; means for coupling said body to said blow tube with said inlet end of said air passage in communication with said outlet hole; and air flow control means occupying said air passage between its ends for producing a predetermined flow characteristic in air flowing through said air passage, said air flow control means being located substantially midway between the ends of said air passage.

* * * * *

UNITED STATES PATENT AND TRADEMARK OFFICE
CERTIFICATE OF CORRECTION

PATENT NO. : 5,562,251
DATED : October 8, 1996
INVENTOR(S) : Jeff Elliott

It is certified that error appears in the above-indentified patent and that said Letters Patent is hereby corrected as shown below:

Claim 6, line 1, change "6" to -- 4 --.

Claim 17, line 1, change "15" to -- 16 --.

Claim 18, line 1, change "15" to -- 17 --.

Signed and Sealed this

Second Day of September, 1997

Attest:

BRUCE LEHMAN

*Attesting Officer*  *Commissioner of Patents and Trademarks*